United States Patent [19]

Matsumura et al.

[11] Patent Number: 5,224,089
[45] Date of Patent: Jun. 29, 1993

[54] DIGITAL SIGNAL INFORMATION REPRODUCTION APPARATUS

[75] Inventors: Asayuki Matsumura; Masayoshi Nakamura, both of Hirakata, Japan

[73] Assignee: Matsushita Electric Industrial Co., Ltd., Osaka, Japan

[21] Appl. No.: 836,799

[22] Filed: Feb. 18, 1992

Related U.S. Application Data

[63] Continuation-in-part of Ser. No. 543,543, Jun. 26, 1990.

[30] Foreign Application Priority Data

Jun. 30, 1989 [JP] Japan .................. 1-170201

[51] Int. Cl.⁵ .................. H04N 5/76; G11B 15/46
[52] U.S. Cl. .................. 369/124; 369/60; 360/73.03
[58] Field of Search ............ 369/124, 60; 360/73.03, 360/73.06

[56] References Cited

U.S. PATENT DOCUMENTS 4,603,412 7/1986 Yamazaki et al. .......... 360/73.03
4,796,247 1/1989 Vogelsang .................. 369/44

FOREIGN PATENT DOCUMENTS 2-15456 1/1990 Japan ................... 369/124

Primary Examiner—Jack I. Berman
Attorney, Agent, or Firm—Stevens, Davis, Miller & Mosher

[57] ABSTRACT

In a digital signal information reproduction apparatus such as a compact disk player and a digital audio tape deck, the digital information recorded on a recording medium is read therefrom at a speed higher than usual during a first predetermined time period from the start of the read operation and at the usual speed for the remainder of the read operation. The read-out information is stored in a memory (such as a RAM), and the information stored in the memory is read out and reproduced at the usual playing speed. The information is thus read from the recording medium during a period shorter than the period required for the playing operation. The time between completion of reading the information from the recording medium and completion of the playing operation can be efficiently used for exchange of the recording medium so that when the playing operation is completed, a new recording medium is already loaded on the apparatus, thus enabling, e.g., continuous playing of pieces of music stored on a compact disk or digital audio tape.

9 Claims, 7 Drawing Sheets

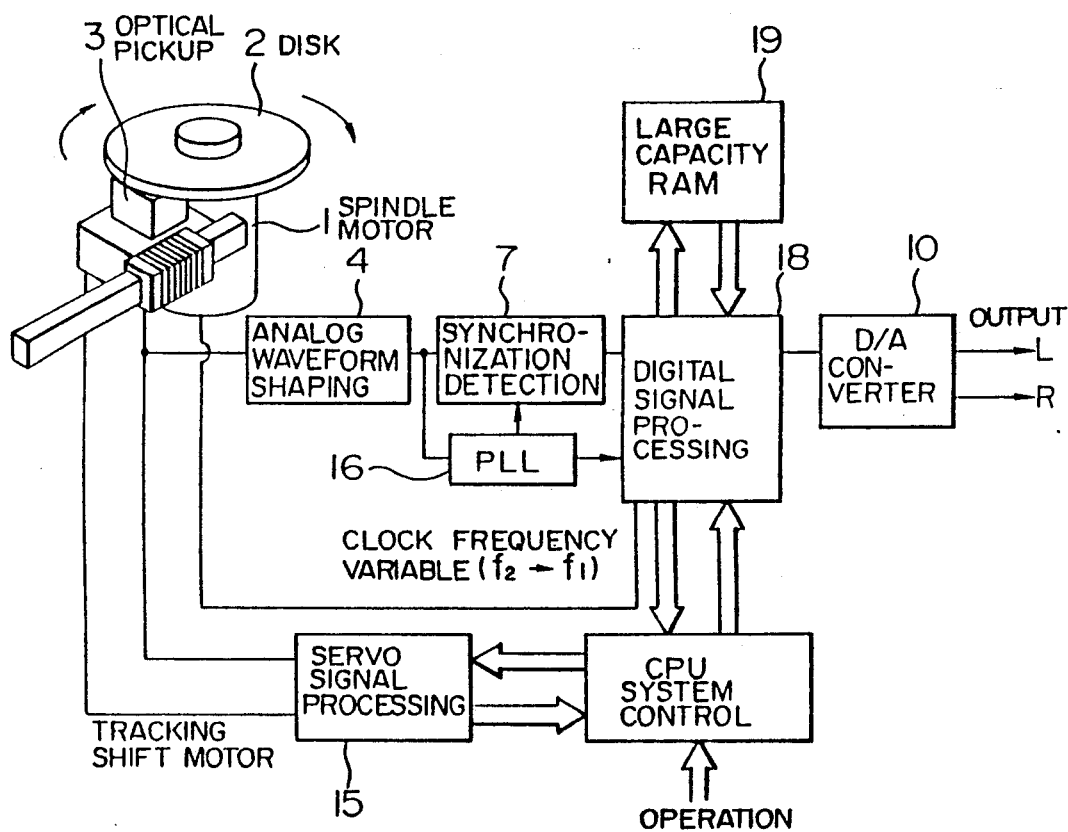
F I G. 1

DIGITAL SIGNAL INFORMATION REPRODUCTION APPARATUS

This is a continuation-in-part of Ser. No. 07/543,543 filed Jun. 26, 1990, the entire subject matter of which is expressly incorporated by reference herein.

BACKGROUND OF THE INVENTION

The present invention relates to an apparatus for reproducing digital signal information in a compact disk player, digital audio tape deck, etc.

The tremendous supply of digital audio apparatus such as a compact disk player in markets in recent years has permitted easy amusement by general users.

The conventional digital audio apparatus will be explained in an example of a compact disk player.

FIG. 4 is a block diagram of the compact disk player. Using this figure, a brief explanation will be given for general flow of digital signals. Rotating a spindle motor 1 rotates a disk 2; then an optical pickup 3, arranged near the disk 2, reads digital signals recorded on the disk 2. One of them, referred to as an RF signal, is sent to an analog waveform signal shaping block 4, while the other of them, referred to as a servo signal, is sent to a servo signal block 5. The servo signal contributes to good continuous reading of pits of data engraved on the disk 2. The RF signal, passed through the analog signal shaping block 4, changes into a pulse train waveform in accordance with the information recorded on disk 2, which is converted into an impulse waveform by a PLL circuit block 6. The impulse waveform is a pulse train waveform corresponding to a clock frequency owing to correlation with a synchronous detection circuit block 7; this pulse train waveform is sent to a digital signal processing block 8. The clock frequency generally determined is actually 4.3218 MHz; it is now assumed to be fi-Hz for convenience of explanation.

The data subjected to digital processing by the digital signal processing circuit block 8 is once stored in a RAM block 9, and thereafter it is returned to the digital signal processing circuit block 8 in synchronism with a clock pulse provided by a quartz oscillator therein. The resultant data is supplied to a D/A converter circuit block 10 for its D-A conversion. The analog signal thus formed is outputted as a left (L) channel signal and a right (R) channel signal.

The RAM 9 generally has a large capacity of 16K bits. Data is inputted or outputted from the RAM 9 at a very high speed; the signal (data) is once stored in the RAM 9 and thereafter read out instantaneously therefrom. This contributes to reducing the delay time, i.e., the time from when the optical pickup starts to read the signal on the disk 2 to when the read signal is outputted as an analog signal.

FIGS. 5A, 5B and 5C show time changes in numerical values of main concepts in the prior art. In the abscissa, the time t0 represents a disk play starting time, the data read start time, the start time of disk reproduction, and the data store start time. Time t3 represents a disk play ending time and the data output completion time.

FIG. 5A illustrates time changes in RAM capacity. The ordinate represents the amount of data actually stored in the RAM 9; N1 corresponds to bits of ten thousand and several thousands. Strictly speaking, a time lag occurs from the time t0 to the time when N1 is reached; this time lag can be disregarded since it is 0.01 sec or less. The time delay from start of read of data to production of analog signals (actual sound production), which actually occurs, can be also disregarded since it is very short. N1, illustrated constant from the time t0 to t3, actually changes continuously when viewed in a small scale; it is illustrated as shown in FIG. 5A since it is averagely constant.

FIG. 5B shows time changes in the clock frequency in the PLL circuit block 6. The clock frequency remains constant f1 from the time t0 to t3. The clock frequency in reading out the data once stored in the RAM 9 as mentioned above is set to be equal to the above clock frequency in the PLL circuit block 6. Therefore, a predetermined amount of data is continuously stored in or read from the RAM 9.

FIG. 5C shows time changes in the linear speed of the disk at the position of the optical pick-up. This linear speed is equal to the speed of reading the data on the disk. In the case of a compact disk player, this linear speed S1 is set to be 1.2 to 1.4 m/s. Namely, the linear speed S1 is constant from the time t0 to t3. This was the feature of the compact disk player.

The above arrangement in which the disk playback time means a playing time as it is has the following drawback. It takes a time to start the playback of another disk after having enjoyed a piece of music, etc. Specifically, extraction of one disk from the spindle motor and setting of another disk requires a loading mechanism, so that actual exchange of disks takes several seconds (usually at least ten).

SUMMARY OF THE INVENTION

An object of the invention is to provide a digital signal information reproduction apparatus which permits users to continuously enjoy play without time loss by exchanging disks within the present playing.

In order to attain the above object, the digital signal reproduction apparatus according to the present invention comprises a large capacity of RAM as a memory for storage for a predetermined time and a read-out PLL circuit in which the clock frequency is made variable.

The present invention, through the above arrangement, can read the data on the disk at a higher speed than the prior art by a predetermined time, which shortens the disk reproduction time correspondingly. This permits the disks to be exchanged prior to completion of the present playing, thereby preparing start of another playing; the user, therefore, can enjoy another playing with no time loss.

Specifically, the present invention provides an information reproduction apparatus comprising:

means for reading information signals from an information recording medium;

means for storing the read information signals corresponding to a first predetermined time period; and control means for controlling reading of the information signals from the recording medium at a reproduction speed higher than usual during a second predetermined time period from start of reading the information signals so as to be stored in the storing means, and reading of the information signals stored in the storing means at the usual speed so as to read them at the usual reproduction speed also after completion of reading the information signals from the recording medium. The control means can comprise means for varying the first speed during the first predetermined time period in accordance with the length of the information to be reproduced. The control means can alternatively comprise means for varying the first predetermined time period in accordance with the length of the information to be reproduced. The control means can further alternatively comprise means for varying both the first predetermined time period and the first speed in accordance with the length of the information to be reproduced.

BRIEF DESCRIPTION OF THE DRAWINGS

FIG. 1 is a block diagram of the compact disk player according to a first embodiments of the present invention;

DETAILED DESCRIPTION OF THE INVENTION

Figure 2A:
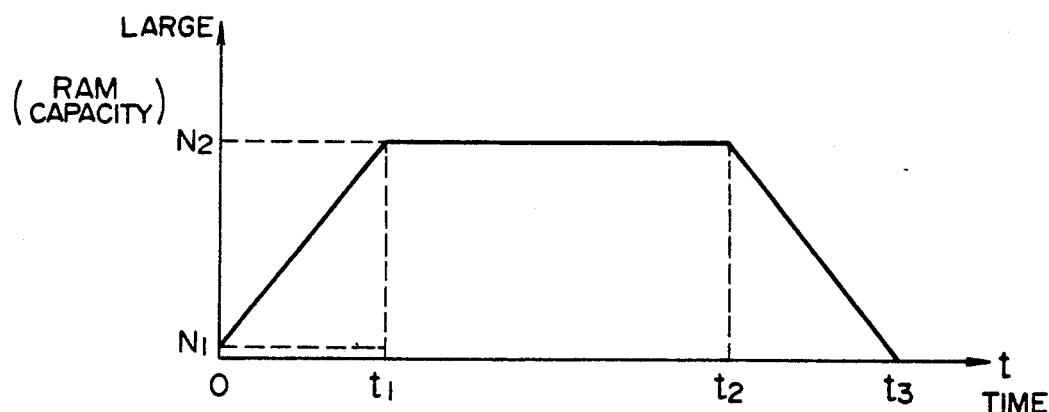
FIGS. 2A, 2B and 2C are time charts of the amount of storage in RAM in the embodiments of FIGS. 1 and 6, of the clock frequency in a PLL circuit therein, and of the linear speed of a disk therein, respectively.

Now referring to the drawings, explanation will be given for the digital signal reproduction apparatus according to a first embodiment of the present invention.

Figure 4:
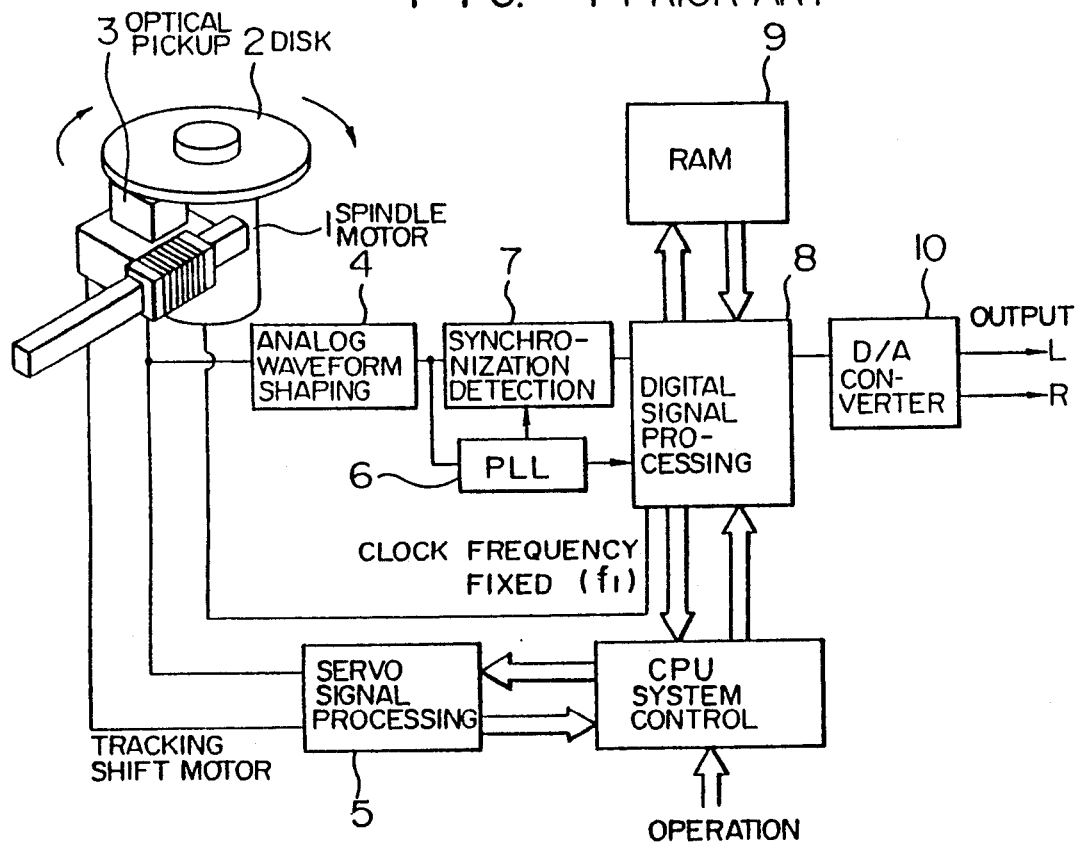
FIG. 4 is a block diagram of the prior art compact disk player.

FIG. 1 is a block diagram of the digital signal reproduction apparatus (compact disk player) according to the first embodiment of the present invention. The components having the same functions as those of the components in the prior art of FIG. 4 will not be explained here.

The compact disk player according to this embodiment is different from the prior art in a RAM 19, a PLL circuit block 16, a servo signal processing circuit 15, etc.

In this embodiment, the disk 2 is rotated for the time up to t1 elapsed from start of its reproduction at time t0 at the linear speed S2 of a disk at the position of an optical pickup. S2 is much larger than speed S1 at which the disk is rotated during a comparable time period in the prior art. Disk 2 is rotated at the usual linear speed, i.e., S1, for the time from t1 to the data read ending time t2. Then, the digital signal processing circuit block 18 issues an instruction, but the RF signal as data will also vary. Therefore, the clock frequency in the PLL circuit block 18 must be also varied; it is set for f2 during the time from start of disk reproduction to t1, and is thereafter changed to f1.

A much larger amount of data than usual is read during the time up to t1 so that the RAM 19 is required to have a much larger capacity as a memory than in the prior art. Additionally, the data is read from the RAM 19 at a given speed from start of reproduction of the disk.

Figure 2B:
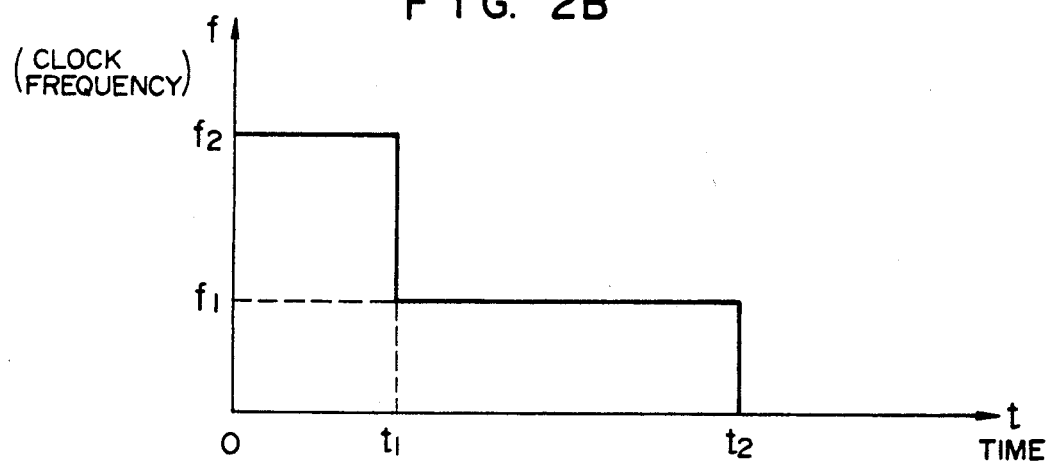
Figure 2C:
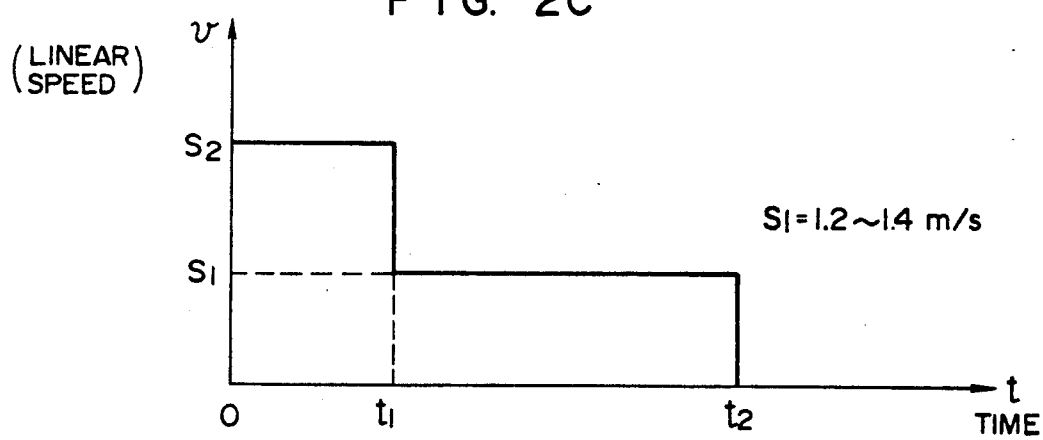
Figure 2D:
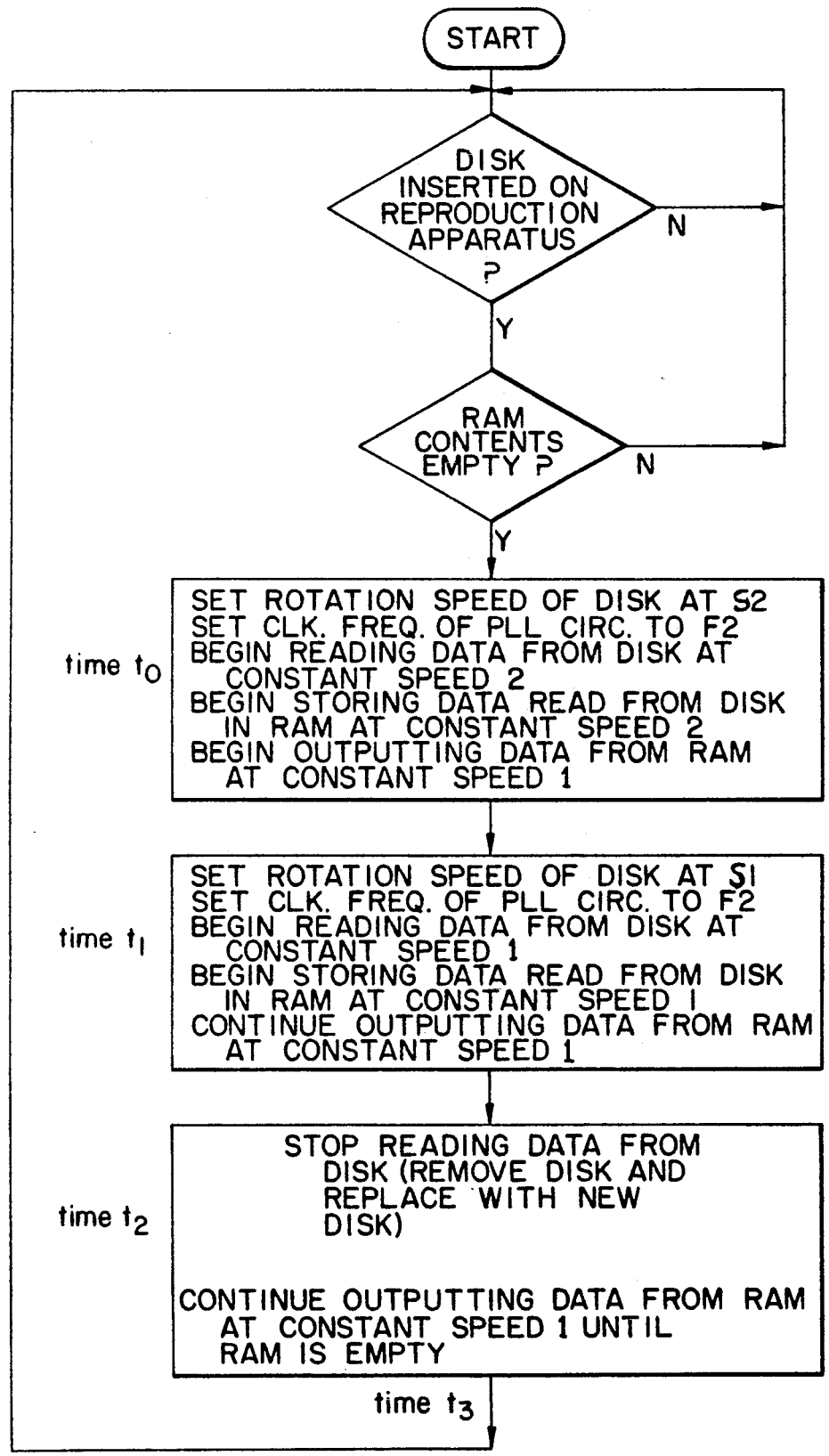
FIG. 2D is a flow chart illustrating the first embodiment of FIG. 1.

FIGS. 2A, 2B and 2C show time changes of the numerical factors of these components. FIG. 2A shows the time change in the RAM storage amount (number of bits) in this embodiment. N2 (bits) are much larger than N1 adopted in the prior art. For example, the number of bits N required to store the data corresponding to the playing time of 30 sec. can be expressed by $$\begin{aligned}N &= n \times M \times F \times 30 \text{ sec.} \\ &= 2 \times 16 \times 44.1 \times 10^3 \times 30 \\ &= 42.3 \times 10^6 \text{ bits} \\ &= 42.3 \text{ M bits}\end{aligned}$$

where F is a sampling frequency (44.1 Khz), M is the number of bits at one channel (16), and n is the number of channels (2). This storage amount is much larger than that of the prior art RAM.

As seen from FIG. 2A, the RAM storage amount has already become N1 at the time t0 which represents the start time of disk reproduction. Actually, it takes a slight time to store the data of N1 bits in the RAM from start of disk reproduction; the data of N1 bits, however, are almost instantaneously stored so that this time has been disregarded as negligible. Also, the data of N1 bits represent the minimum amount when reading of the data as signals is started.

During the period up to time t1, a much larger amount of data than that read from the RAM 19 is read from the disk 2 and stored in the RAM 19; therefore, the amount of data stored in the RAM 19 increases with passage of time, and it reaches N2.

After the time t1, the rotation speed of the disk 2 is reduced to the normal or standard speed S1; therefore, during the period from time t1 to time t2, the amount of data stored in RAM 19 is equal to that read therefrom. Thus, during the period from time t1 to time t2, the amount of data stored in RAM 19 remains N2.

At time t2, data reproduction from disk 2 is terminated; in other words, the data are no longer read from the disk 2. As a result, after time t2, the data stored in the RAM 19 will be only read. Thus, the amount of data stored in the RAM 19 decreases with passage of time to become zero at time t3. Namely, the playing is terminated and data output is completed.

FIG. 2B shows the time change in the clock frequency in the PLL block 16 during the disk reproduction. As described above, during the period from time t0 to time t1, the rotary speed S2 is higher than the normal speed S1 so that the clock frequency is f2 correspondingly; and during the period from time t1 to time t2, the rotation speed of the disk is reduced to the normal speed so that the clock frequency is correspondingly reduced to f1.

FIG. 2C shows the time change in the linear speed of the disk 2 at the position of the optical pickup 3 during the disk reading or reproduction from time t0 to time t2. As described above, during the period from time t0 to t1, the rotary speed is higher than the normal speed so that the linear speed is S2 correspondingly; during the period from time t1 to time t2, the rotation speed of the disk is reduced to the normal speed so that the linear speed is correspondingly reduced to S1.

As described above, in accordance with this embodiment, the rotation speed of the disk 2 is made higher than the normal rotation speed thereof during only the period from time t0 to t1, and the amount of data stored during this period is stored in the RAM 19 having a very large storage capacity; in this case, since the data are read out from the RAM 19 at the normal speed, a time difference (extra time) can be placed between time t2 when the disk reading or reproduction is terminated and time t3 when the playing is terminated. During this time difference, no data is being read from disk 2 but data stored in RAM 19 is being output. By exchanging the disk during this time difference which provides a time for standby of the playing by another disk, the playing can be continuously carried out.

Additionally, although the speed S2 of reading the data from the disk 2 has not been particularly defined in this embodiment, it can be set for up to the maximum speed which depends on the synchronization speed in the PLL circuit block 16 and the control capability of the spindle motor 1.

Figure 6:
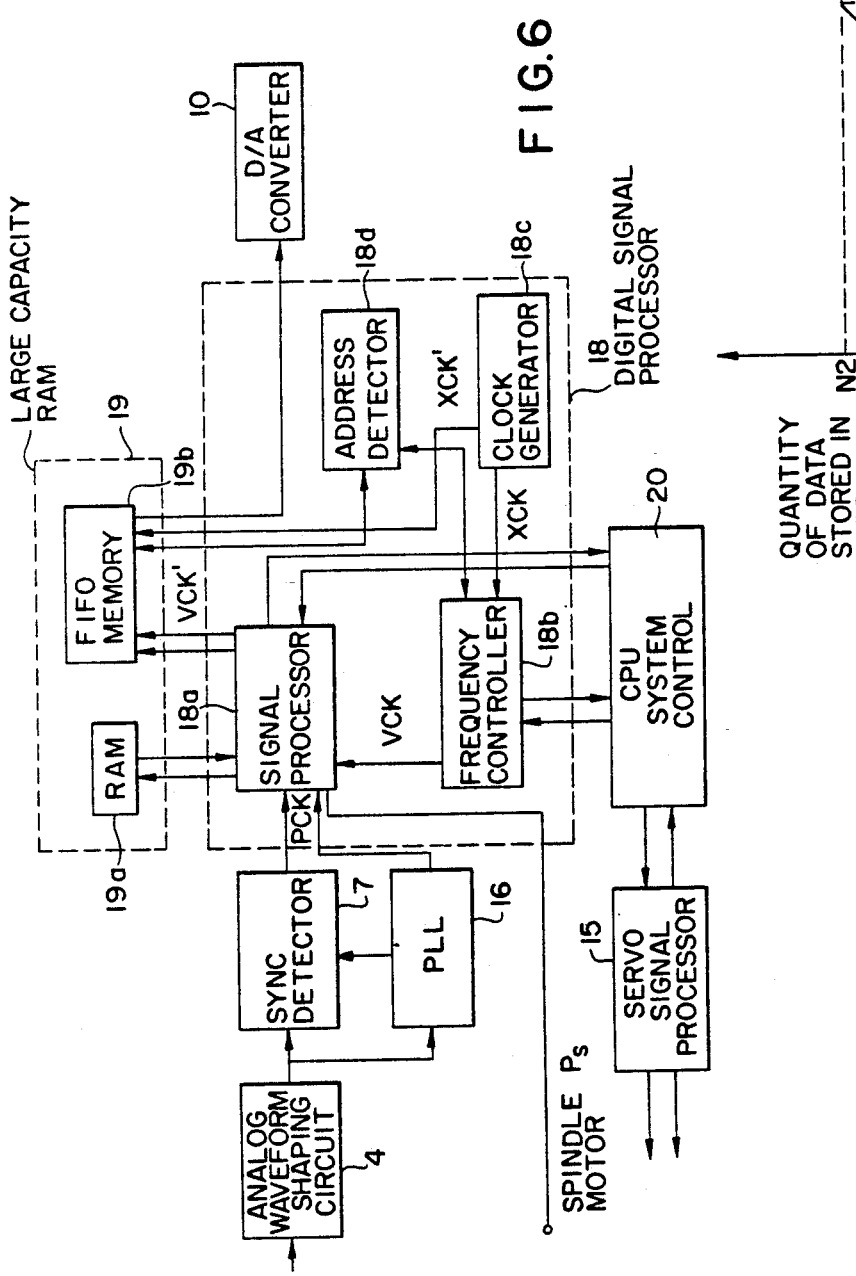
FIG. 6 is a block diagram illustrating a third embodiment of the invention.

Although it is apparent that the present invention is not limited to any particular values of parameters N1, N2, t1, t2, f1, f2 or S2, the following values are exemplary, with reference to FIG. 6.

Assuming FIFO memory 19b is capable of storing data for 30 seconds and the disk data reading device is capable of reading at an optional speed which is selected below or equal to twice a usual or standard reproduction speed, then the above parameters are as follows:

N1: about 16 Kbit, N2: about 42.3 Mbit (specified in the upper part of the specification); t1: about 30 secs (with a reading speed of twice the usual reproduction speed); t2: equal to (t3 − t1) =90 secs with t3 =120 seconds which indicates the disk play-back ending time; f1: 4.3218 MHz (usual clock frequency); f2: 8.6436 MHz (with a reading speed of twice the usual reproduction speed); S1: 1.2 to 1.4 m/sec; S2: 2× S1 =2.4 to 2.8 m/sec (with a reading speed of twice the usual or standard reproduction speed). The usual or standard reproduction speed for a CD player, for example, corresponds to 44.1 kHz sampling. The usual reproduction speed is the same as the usual reading speed S1 from the storing means. As shown in FIG. 6, the data outputting speed of FIFO memory 19b corresponds to the rate of clock signals XCK of clock generating means 18c, so that data stored in the FIFO memory 19b are outputted after the completion of the data reading operation from the disk.

A detailed description of the FIG. 6 embodiment will now be provided.

Digital signal processing circuit block 18 comprises signal processing circuit block 18a, frequency control circuit block 18b, clock generating block 18c, and address detecting block 18d. A large capacity RAM 19 includes RAM 19a and FIFO memory 19b. FIFO memory 19b outputs data at a speed determined by output clock generating means 18c provided in digital signal processor 18.

Block 18a comprises a demodulation circuit for demodulating a modulated signal and an error correction circuit for detecting and correcting code errors generated due to dropouts or like causes, and compensating uncorrected errors by analogy from neighboring before and after signals. The block 18b also generates an error signal Ps for rotating the spindle motor so as to equalize frequencies of the clock signal PCK of the PLL circuit 16 and clock VCK of block 18b. The signal supplied to block 18a is processed by the demodulation circuit and error correction circuit through which processing data is stored in or read from RAM 19a in order to achieve absorption of jitter (time base variations of digital signal) or error correction. In such a case, the speed of writing data in RAM 19a is determined by the clock PCK of the PLL circuit 16, and the speed of reading data from RAM 19a is determined by clock VCK. These speeds appear identical when observed over a sufficiently long period.

The data signal processed in block 18a for the demodulation and error correction is supplied to and stored in FIFO memory 19b which is a first-in, first-out memory which first outputs data stored earliest therein. Assuming a clock signal VCK, for storing data in FIFO memory 19b, the clock signal VCK, is produced by converting the reference clock XCK (outputted from block 18c) to clock VCK by control block 18b and frequency-dividing clock VCK by block 18a.

The clock signal XCK for outputting data from FIFO memory 19a is produced by frequency-dividing the reference clock XCK'. The address detector 18d monitors the quantity of data stored in the memory 19b, and the frequency of clock signal VCK is controlled dependent upon the monitored data quantity. The CPU system control 20 operates to effect a smoother data reading operation from the disk 2 and data storing and reading operations with the FIFO memory 19a in dependence upon the disk Table-of-Contents (TOC) information and the program function.

The operation of the above system is as follows.

The block 18c supplies given fixed frequencies of the clock signals XCK and XCK' from a starting time t0 to a disk play-back ending time t3 (i.e., time period t0 to t3).

In the period t0 to t1, with start of the disk reading operation, the rate of the output clock VCK of the circuit 18b is frequency-converted to be larger than the rate of the reference clock VCK and is input to the signal processing circuit block 18b. Thus, the spindle motor speed is controlled to become higher than the standard speed in order to achieve the high speed disk data read-out operation. Namely, the higher speed rotation is caused to make equal the rates of the clock PCK of the PLL and the clock VCK of the frequency control circuit 18b. Signal data are reproduced and input to the block 18a at the higher speed. The frequency of the higher-rate clock PCK takes a value f2. Thus processed data are subsequently stored in the FIFO memory 19b by the higher rate clock VCK.

On the other hand, data are read out from the FIFO memory 19b at the usual or standard speed determined by the clock XCK, resulting from the division of the reference clock XCK. The memory incrementally stores data for the difference of the stored data quantity and read-out data quantity.

At time t1 (FIG. 2A), memory 19b is fully stored with data; time t1 or the full condition of memory 19b is detected by address detector 18d which instructs the frequency control circuit 18b. At this time, circuit 18b operates to equalize the frequencies of the outputting clock VCK and the reference clock XCK.

When these clocks have equal frequencies, the signal processing circuit 18a detects this condition and causes the spindle motor to rotate at the standard speed. The frequency of the clock PCK changes to f1, and data are inputted to the memory 19b by the standard speed of the clock VCK' = XCK', which is equal to the data outputting speed of the memory 19b. From the time t1 to the time t2, the data quantity of the memory 19b does not change without incrementing or decrementing.

At the time t2, the data reproducing operation (i.e. the reading operation from disk 2) is ended and no more data is being inputted to FIFO memory 19b. Thus, after time t2, data are only outputted from FIFO memory 19b to decrease the quantity of the stored data, and the quantity becomes zero at the play-back ending time t3. By utilizing the period t2 to t3, it is possible to effect exchange of the disk or disk accessing. Specific values of the above control factors are shown below as an example for the embodiment of FIG. 6 (where the disk data reproducing speed is taken as twice the standard speed):

TABLE

| period | frequency of PCK | frequency of XCK' | frequency of Vck' |
| --- | --- | --- | --- |
| 6-t1 | 8.6436 MHz (f$_2$) | about 176.4 KHz (fx) | about 352.8 KHz (2xfr) |
| t1-t2 | 4.3218 MHz (f$_l$) | about 176.4 KHz (fx) | about 176.4 KHz (fx) |
| t2-t3 | — | about 176.4 KHz (fx) | — |

—: No clocks are generated because of the termination of reproduction from the disk.

The FIG. 6 embodiment thus employs a FIFO memory 19b and a frequency control circuit 18b and employs the novel concept of outputting data from memory 19b at a standard speed, inputting and storing data in memory 19b by changing the writing clock frequency, and outputting the stored data during play back while enabling disk exchange or disk access operations before the completion of the play back operation.

Figure 7:
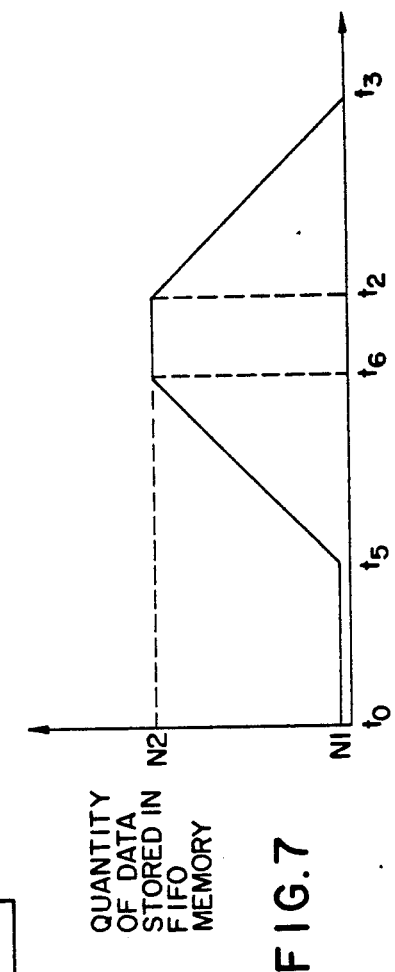
FIG. 7 is a time chart illustrating a modification of the third embodiment wherein the data storing operation is started at a given delay from the start of the read operation from a disk.

It should be noted that it is not necessary to limit the starting time t1. It is possible to start storing data in FIFO memory 19b just after the start of the data reading operation as shown in FIG. 2A, or alternatively, it is also possible to start the data storing operation in FIFO 19b with a certain delay after the start of the reading operation as shown in FIG. 7. In FIG. 7:

```
time t0 = data read start time
        = data store start time
time t5 = data store completion time
time t6 = data read end time
time t3 = data play-back end time
```

Now referring to FIGS. 3A and 3B, explanation will be given for the second embodiment of the present invention in which the disk reproduction time is very short.

Figure 3A:
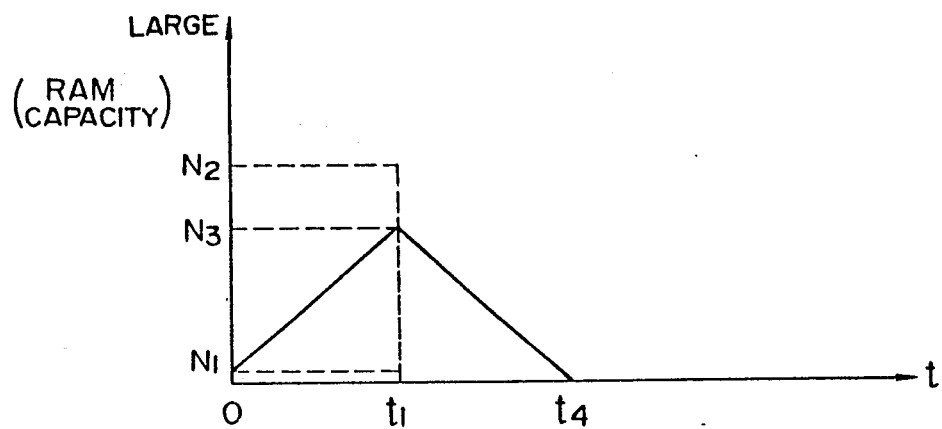
FIG. 3A is a time chart of the amount of storage in RAM in the compact disk player according to a second embodiment of the present invention.
Figure 3B:
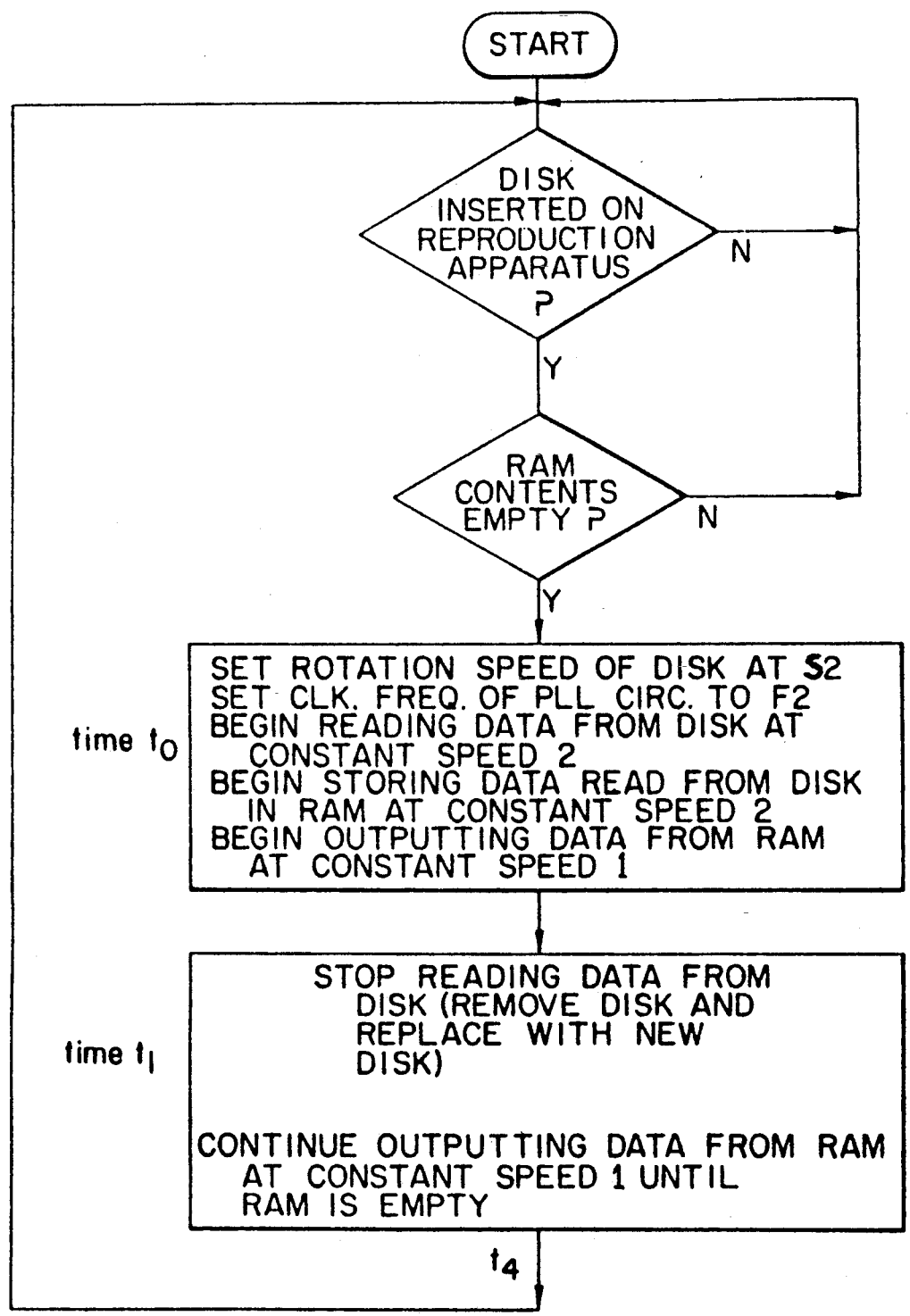
FIG. 3B is a flow chart illustrating the second embodiment.
Figure 5A:
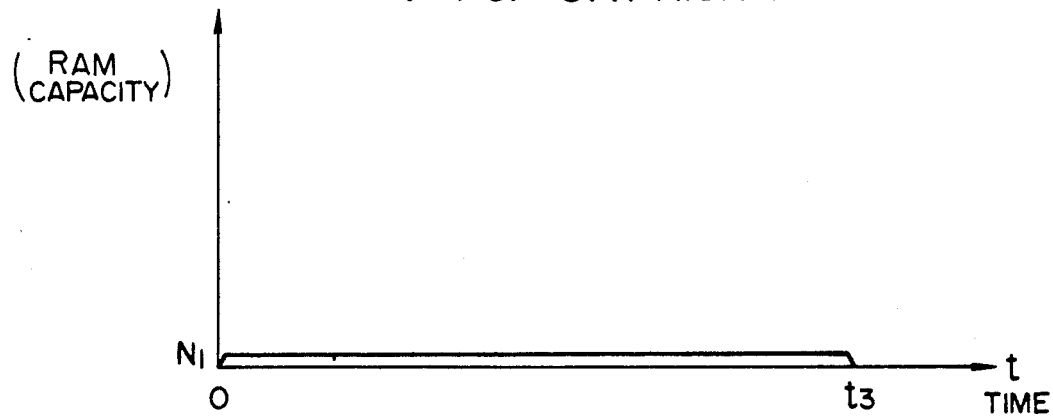
FIGS. 5A, 5B and 5C are time charts of the amount of storage in RAM in the prior art, of the clock frequency in a PLL circuit therein, and of the linear speed of a disk therein, respectively.
Figure 5B:
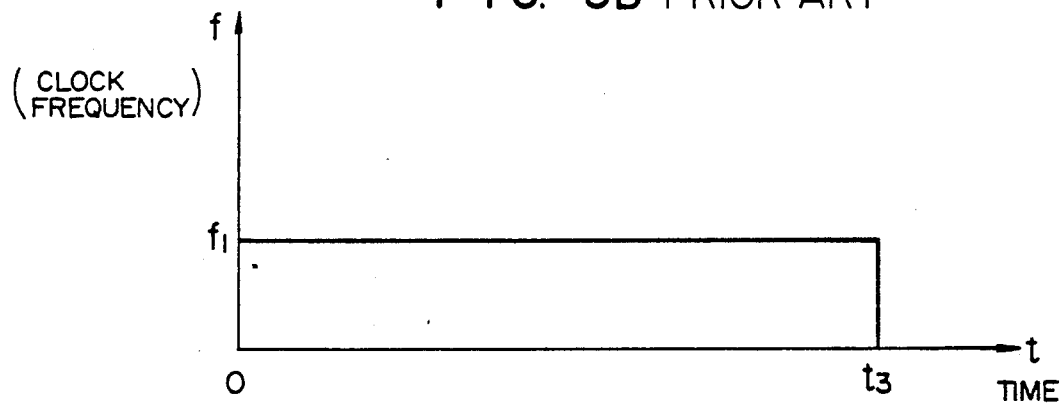
Figure 5C:
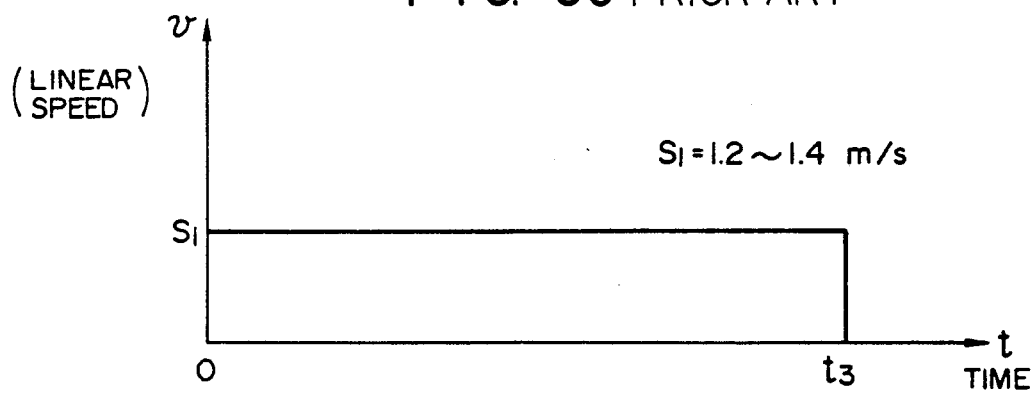

FIG. 3A shows the time change in the amount of data stored in the RAM 19 in this embodiment. As seen from FIG. 3A, the data read from the disk during the period from time t0 to time t1 will be stored in the RAM 19 as in the first embodiment. In this case, if the disk reproduction time is short, i.e., the length of a piece of music is short, the amount of data stored in the RAM 19 at time t1 does not reach the maximum value N2 of the storage capacity but terminates with N3 which is smaller than N2. After time t1, the data stored in the RAM 19 will be read out to terminate the playing at time t4. Also in this embodiment, a time difference (extra time), although it is short, can be placed between time t1 when the disk reproduction (i.e., data reading from the disk) is terminated and time t4 when the playing is terminated. FIG. 3B is a flow chart illustrating the second embodiment.

In the embodiments described above, the data read from the disk 2 are almost instantaneously outputted (i.e., there is a very short time difference between the starting time of disk reproduction (i.e., data reading from the disk) and the time when the data are outputted). However, the data read from the disk 2 during a predetermined time may be once stored in the RAM 19 without being read out therefrom during this predetermined time period, and thereafter the data may be read from the RAM 19 through the signal processing circuit 8.

Further, although in the above embodiments, the compact disk player was used as an information reproduction device, the technical idea can be applied to any digital signal. Therefore, the present invention can be applied to the case where the analog signals have been A/D converted into the digital signals before they enter the apparatus according to the present invention.

Furthermore, the provision of a signal processing-/control circuit 18 which varies the high speed of reading the data from the disk 2 in accordance with the playing time permits the difference between the reproduction (or disk read) completion time t2 and the playing completion time t3 to be held constant. Although the above-described embodiments involve a constant high speed of reading the data from the disk, the present invention is not limited to employing a constant disk reading speed. For example, the reading speed can be changed according to the amount of data stored in the FIFO memory 19b (see FIG. 6) such as by (1) selecting twice the standard or usual reading speed until half (N2/2) of the whole memory capacity is stored with the read data, (2) thereafter selecting a rate of one and one half times the usual reading speed until 75% of the whole memory capacity is filled with data, and (3) thereafter selecting 11/10 times the usual reading speed until the memory has been fully stored with data Such a reading speed changing mode achieves a smooth change-over of the reading speed, thereby making it possible to avoid problems of disk reading errors due to possible delays in response to spindle motor mechanism operations.

Likewise, the provision of a signal processing/control circuit 18 which, in accordance with the playing time, varies the period when the data are read (e.g., in FIG. 2A, data is read from disk 2 from time t0 to time t2 and in FIG. 3A, data is read from disk 2 from time t0 to time t1) but not the degree of the high speed, permits the above time difference to be held constant. The playback time is controlled by making reference to the disk TOC information. For example, in the case of a long play-back time, it is possible to secure the data amount N2 even if data is stored in the FIFO memory for a long time by selecting a slightly higher reading speed (of a fixed constant speed) than usual. The advantage of this is that the reading operation of the CD player is stabilized because the high reading speed is selected near the usual reading speed (it is possible to increase the precision of the data reading operation to overcome disk surface deviations or eccentricity).

The TOC information can be utilized to ascertain in advance the time period of the information to be reproduced or played back, and a program function may be used to determine a time period of a music selection to be played back. These functions are provided in CPU system control 20.

The same effect can also be obtained by provision of a signal processing/control circuit 18 which varies both components, i.e., the degree of the high speed and the period when the data are read at that high speed. The combination of both varying the high speed of reading from the disk and the period when the data are read achieves even greater stabilization.

Other memory devices such as a magnetic tape, in place of the RAM used in the above embodiments, may be used.

In accordance with the present invention, digital data recorded on a recording medium are read therefrom at a speed higher than usual during a predetermined period from start of reproduction of the recording medium, the data read during that period are simultaneously stored in the RAM having a large storage capacity, and the digital data is read from the recording medium at the normal speed after passage of the above period. Therefore, a time difference can be provided between the data read completion time (reproduction completion time) and data outputting completion time (playing completion time); during this time difference, another recording medium on which digital signals have been recorded can be prepared for its reproduction. Thus, in accordance with the present invention, another playing can be smoothly enjoyed without time loss.

We claim:

1. An information reproduction apparatus, comprising:
   read means for reading information signals from an information recording medium from a data read start time to a data read completion time;
   memory means for storing said information signals read from the recording medium by said read means, said memory means having a memory capacity expressible as a numerical quantity; and
   control means, including a reference clock generator means for generating a first predetermined frequency signal and a second predetermined frequency signal, for controlling (i) said read means to read said information signals from the recording medium at a first read speed determined by said first predetermined frequency signal, (ii) said memory means to store said information signals at said first read speed during a time in which said read means reads said information signals at said first read speed and to determine when a predetermined percentage of said memory capacity is filled, (iii) said read means to read said information signals from the recording medium at a second read speed which is lower than said first read speed and which is determined by said second predetermined frequency signal after said predetermined percentage of said memory capacity has been filled, and (iv) said memory means to store said information signals at said second read speed after said predetermined percentage of said memory capacity has been filled and to output said information signals stored in said memory means so that a data output completion time of said memory means occurs after said data read completion time, whereby information signals are still being output from said memory means after completion of reading of said information signals from the recording medium by said read means.

2. An information reproduction apparatus according to claim 1, wherein said control means further comprises means for controlling (a) said memory means to determine when a predetermined intermediate percentage of said memory capacity is filled, said predetermined intermediate percentage being less than said predetermined percentage, (b) said read means to read said information signals from the recording medium at an intermediate read speed which is between said first read speed and said second read speed during an intermediate time period between a time when said predetermined intermediate percentage has been filled and a time when said predetermined percentage has been filled, and (c) said memory means to store said information signals at said intermediate read speed during said intermediate time period.

3. An information reproduction apparatus according to claim 2, wherein said control means further comprises means for controlling (I) said memory means to determine when a predetermined second intermediate percentage of said memory capacity is filled, said predetermined second intermediate percentage being greater than said predetermined intermediate percentage and less than said predetermined percentage, (II) said read means to read said information signals from the recording medium at a second intermediate read speed which is between said intermediate read speed and said second read speed during a second intermediate time period between a time when said predetermined second intermediate percentage has been filled and a time when said predetermined percentage has been filled and a time when said predetermined percentage has been filled, and (III) said memory means to store said information signals at said second intermediate read speed during said second intermediate time period.

4. An information reproduction apparatus, comprising:
   read means for reading information signals from an information recording medium from a data read start time to a data read completion time;
   signal processor means in communication with said read means for demodulating and error correcting said information signals read from said read means;
   FIFO memory means in communication with said signal processor means for storing said information signals demodulated and error corrected by said signal processor means and for outputting said information signals demodulated and error corrected by said signal processor means on a first in, first out basis; and
   control means, including a reference clock generator means for generating a first predetermined frequency signal and a second predetermined frequency signal, for controlling (i) said read means to read said information signals from the recording medium at a first read speed determined by said first predetermined frequency signal during a first time period from said data read start time to a FIFO-filled time at which a capacity of said FIFO memory means is filled, (ii) said signal processor means during said first time period to demodulate and to error correct said information signals at said first read speed, (iii) said FIFO memory means to store at said first read speed said information signals demodulated and error corrected by said signal processor means in operation (ii) above, (iv) said read means to read said information signals from the recording medium at a second read speed which is lower than said first read speed and which is determined by said second predetermined frequency signal during a second time period from said FIFO-filled time to a data output completion time at which output of information signals stored in said FIFO memory means is completed, (v) said signal processor means during said second time period to demodulate and to error correct said information signals at said second read speed, and (vi) said FIFO memory means to store at said second read speed said information signals demodulated and error corrected by said signal processor means in operation (v) above, said data read completion time occurring before said data output completion time, said control means controlling output of said information signals stored in said FIFO memory means from a data output start time at which said FIFO memory means starts to output said information signals stored in said FIFO memory means to said data output completion time, whereby information signals are still being output from said FIFO memory means after completion of reading of said information signals from the recording medium by said read means.

5. An information reproduction apparatus according to claim 4, wherein said control means controls said signal processor means to output said demodulated and error corrected information signals to said FIFO memory means substantially without a time delay while said signal processor means demodulates and error corrects said information signals.

6. An information reproduction apparatus according to claim 4, wherein said control means controls said signal processor means to introduce a time delay between an operation of demodulating and error correcting said information signals and an operation of outputting said demodulated and error corrected signals to said FIFO memory means.

7. An information reproduction apparatus according to claim 4, further comprising buffer memory means in communication with said signal processor means for buffering said information signals during an operation of demodulating and error correcting of said information signals by said signal processor means.

8. An information reproduction apparatus according to claim 4, wherein said control means controls a speed at which said information signals are output from said FIFO memory means so as to be lower than said first read speed.

9. An information reproduction apparatus, comprising:
read means for reading information signals from an information recording medium from a data read start time to a data read completion time;
signal processor means in communication with said read means for demodulating and error correcting said information signals read from said read means;
FIFO memory means in communication with said signal processor means for storing data of said information signals demodulated and error corrected by said signal processor means, and for outputting the data of said information signals on a first in, first out basis; and
control means, including a reference clock generator means for generating a first predetermined frequency signal and a second predetermined frequency signal, for controlling (i) said read means to read said information signals from the recording medium at a read speed determined by said first predetermined frequency signal during a read/store time period from said data read start time to said data read completion time, wherein said data read completion time may occur before or at a time at which a capacity of said FIFO memory means is filled, (ii) said signal processor means during said first time period to demodulate and to error correct said information signals at said read speed, (iii) said FIFO memory means to store at said read speed data of said information signals demodulated and error corrected by said signal processor means in operation (ii) above, (iv) said FIFO memory means to output the stored data of said information signals at a reproduction speed determined by said second predetermined frequency signal and lower than said read speed from a data output start time of said FIFO memory means to said data output completion time, whereby information signals are still being output from said FIFO memory means after completion of reading of said information signals from the recording medium by said read means.

* * * * *